United States Patent [19]

Hurley

[11] Patent Number: 4,978,286
[45] Date of Patent: Dec. 18, 1990

[54] VARIABLE CYCLE ENGINE PASSIVE MECHANISM

[75] Inventor: Francis X. Hurley, Chapel Hill, N.C.

[73] Assignee: The United States of America as represented by the Secretary of the Army, Washington, D.C.

[21] Appl. No.: 424,361

[22] Filed: Oct. 17, 1989

[51] Int. Cl.$^5$ .............................................. B63A 1/06
[52] U.S. Cl. ...................................... 416/89; 416/143
[58] Field of Search ...................... 416/87, 88, 89, 143

[56] References Cited

U.S. PATENT DOCUMENTS

| | | |
|---|---|---|
| 2,117,788 | 5/1938 | Cable et al. |
| 2,442,291 | 5/1948 | Hamel |
| 2,510,216 | 6/1950 | Figley |
| 2,986,218 | 5/1961 | Wagner et al. |
| 3,273,655 | 9/1966 | Girard |
| 3,501,248 | 3/1970 | Brocker ................................ 416/89 |
| 3,561,883 | 2/1971 | Berry ................................... 415/131 |
| 3,763,835 | 10/1973 | Miller et al. ...................... 123/41.11 |

FOREIGN PATENT DOCUMENTS 612062 6/1978 U.S.S.R. ................................ 416/89

Primary Examiner—William E. Wayner
Attorney, Agent, or Firm—Saul Elbaum; Paul S. Clohan

[57] ABSTRACT

A mechanism for varying the cycle of a power plant comprising a turbine engine having a housing connected to the rotating spool of the turbine engine with a plurality of propeller blades slideably attached to the housing such that at maximum rotational speed of the turbine engine the blades are extended beyond the cowling of the engine providing external airflow. A nonlinear spring is used for causing the propeller blades to stow within the confines of the cowling of the engine at minimum rotational speed of the engine thus providing no external airflow.

2 Claims, 1 Drawing Sheet

VARIABLE CYCLE ENGINE PASSIVE MECHANISM

RIGHTS OF THE GOVERNMENT

The invention described herein may be manufactured, used and licensed by or for the United States Government for Governmental Purposes without payment to me of any royalty thereon.

BACKGROUND OF THE INVENTION

The present invention relates to propulsion of a vehicle by means of a gas turbine.

The efficiency of the energy generation in a turbine power plant is a function of the pressure ratio of the compression process (including the ram pressure induced in a high-speed vehicle by decelerating the ambient air to bring it aboard the vehicle), the maximum temperature of the cycle, the efficiency of compression and expansion of the turbomachinery components, and the losses associated with pressure drops in static components, leakages, and parasitic air losses.

In reaction propulsion the efficiency of the propulsion process is also a strong function of the velocity at which the propulsive exhaust jet exits from the engine. The propulsive efficiency $P_e$ is given approximately by the equation:

$$P_e = 2/(1+a)$$

where a is the ratio of exhaust velocity (relative to the vehicle) to the vehicle's air speed. Maximum propulsive efficiency is achieved when the exhaust velocity is equal to the air speed or a=1. This ideal condition can be approached but only at the expense of making the propulsor very large and heavy, since the thrust $F_n$ per unit airflow $W_a$ is found to be approximately by the equation:

$$F_n/W_a = V_o(a-1)$$

implying that values of a near unity give vanishingly small thrust per unit airflow. This equation indicated that the thrust per unit airflow is proportional to flight speed, so that a relatively large-mass flow must be handled at low speed.

In the design of a turbine engine for reaction propulsion, this balance of considerations is handled by a spectrum of propulsion systems. For very low flight speeds, very large propulsors are used to accelerate large amounds of air through small velocity increments, only slightly above that low flight speed, as typified by a turboprop aircraft. High speed propulsion systems are designed to accelerate smaller amounts of air to much larger velocities, as typified by the pure jet engine. Turbofans constitute intermediate devices in this propulsion spectrum.

Conventional takeoff and landing aircraft use turboprops for low subsonic flight speeds up to Mach number 0.7, high-bypass turbofans for propulsion from Mach number 0.6 through transonic flight speeds, and low-bypass turbofans or jet engines for propulsion at supersonic flight speeds or for mixed subsonic and supersonic aircraft. Low-bypass turbofans and turbojets are often provided with afterburners for thrust augmentation in special flight regimes.

Compared to the turbojet and, to a lesser degree, to the turbofan, the turboprop offers lower fuel consumption and a higher takeoff thrust. It has low engine noise level, and its propeller can be reversed to shorten the landing run. For these reasons the turboprop is an excellent power plant for aircraft in which these qualities are important. Because of propeller characteristics, the turboprop usually reaches peak operating efficiency at lower cruise speeds than the turbofan and is, therefore, better suited for transports in the speed range below 450 mi/hr, although it is basically possible to reach high subsonic and even supersonic flight speeds with a turboprop. At high altitudes, the turboprop achieves lower cruise fuel consumption than the best reciprocating engines of fuel per equivalent shaft horsepower.

The turbofan is an air-breathing aircraft gas turbine engine with operational characteristics between those of the turboprop and turbojet. Like the turboprop, the turbofan consists of a compressor-combustor-turbine unit, called a core or gas generator, and a power turbine. This power turbine drives a low-or medium-pressure-ratio compressor, called a fan, some or most of whose discharge bypasses the core.

The gas generator produces useful energy in the form of hot gas under pressure. Part of this energy is converted by the power turbine and the fan it drives into increased pressure of the fan airflow. This airflow is accelerated to ambient pressure through a fan jet nozzle and is thereby converted into kinetic energy. The residual core energy is converted into kinetic energy by being accelerated to ambient pressure through a separate core jet nozzle. The reaction in the turbomachinery in producing both atreams produces useful thrust.

In a turbojet, air approaches the inlet diffuser at a relative velocity equal to the flight speed. In passing through the diffuser the velocity of the air is decreased and its pressure increased. The air pressure is increased further as it passes through the compressor. In the combustion chamber a steady stream of fuel is injected into the air and combustion takes place continuously. The high-pressure hot gas passes through the turbine nozzles, which direct it at high velocity against the buckets on the turbine wheel, thereby causing the wheel to rotate. The turbine wheel drives the compressor to which it is connected through a shaft. This is the sole function of the turbine.

After the hot gas leaves the turbine, it is still at a high temperature and at a pressure considerably above atmospheric. The hot gas is discharged rearward through the exhause of the engine at a high velocity.

The thrust obtained is equal to the overall increase in momentum of the gas as a result of its passage through the engine. This thrust is given by the equation:

$$f = M(V_j - V_o)$$

where M = the mass flow of gas per secone through the engine, $V_j$ is the exhaust jet velocity, and $V_o$ is the airplane velocity.

Thus, each type of engine has an optimum flight regime, depending on airspeed, range, and altitude, in which its performance is superior to other propulsion systems. For low speeds and low altitudes, the turboprop engine gives the best performance; next comes the turbofan, and then the turbojet without afterburner. Until the advent of the present invention, no one turbine driven engine could fulfill the requirements met by the three separate engines described above.

OBJECTS AND SUMMARY OF THE INVENTION

It is, therefore, the primary object of this invention to provide the means for a single turbine powered engine to operate efficiently at all flight speeds, from low-level, low-speed, to high-level, high-speed.

In the present invention, propeller blades connected to the rotating spool of the engine are restrained by a non-linear spring mechanism which is opposed by the centrifugal force of the rotating blades, thus allowing propeller blade deployment only in proportion to the power setting of the turbine, i.e., in proportion to the rotational speed of the turbine.

Equations describing the control and power sharing in the variable cycle engine are described below. It is assumed that, in addition to fuel flow, there are two mechanical controls: one is the propeller blade pitch mechanism, whose setting will be represented by $C_p$, and the other is the stator vane pitch mechanism, whose setting will be represented by $C_v$. For a particular flight state and fuel flow to the forward, turbine-driving gas generator, the force $F_t$ on each turbine depends on the swirl imparted by the stator and on the sensed (counter) swirl imparted by rotational speed r:

$$F_t = C_v - C_1 r$$

The power to the turbine $P_t$ is proportional to the product of $F_t$ and the rotational speed:

$$P_t = (C_v - C_1 r) C_2 r$$

Similar equations govern the force and power of the propeller blades, with blade exposed surface area $A_p$ also variable:

$$F_p = (C_p + C_3 r) A_p \text{ and}$$

$$P_p = (C_p + C_3 r) A_p C_4 r$$

The magnitude of $A_p(x)$, where x is degree of extension, is governed by the balance between centrifugal force and spring force:

$$f_k(x) = C_3 r^2 (C_2 + x)$$

which can be solver for $$x = g_k(r)$$

Therefore:

$$A_p = A_p(x) = A_p[g_k(r)]$$

Consequently, $P_p$ is a rapidly increasing function of r for large r, even though it will be negative for small r if $C_p$ is negative. On the other hand, $P_t$ as a function of r is an inverted parabola which eventually turns downward, although it starts off positive since $C_v$ is positive. The intersection of these two curves, themselves determined by the parameters or control settings $C_v$ and $C_p$, determines the turbine speed and the power takeout by the propeller system, as well as the degree of propeller exposure. At supersonic flight speeds, for example, the $C_v$ setting would be such as to feather the blades at low rotational speed, keeping the propellers stowed and the propulsion in the turbojet mode.

DETAILED DESCRIPTION OF THE PREFERRED EMBODIMENTS

Figure 1:
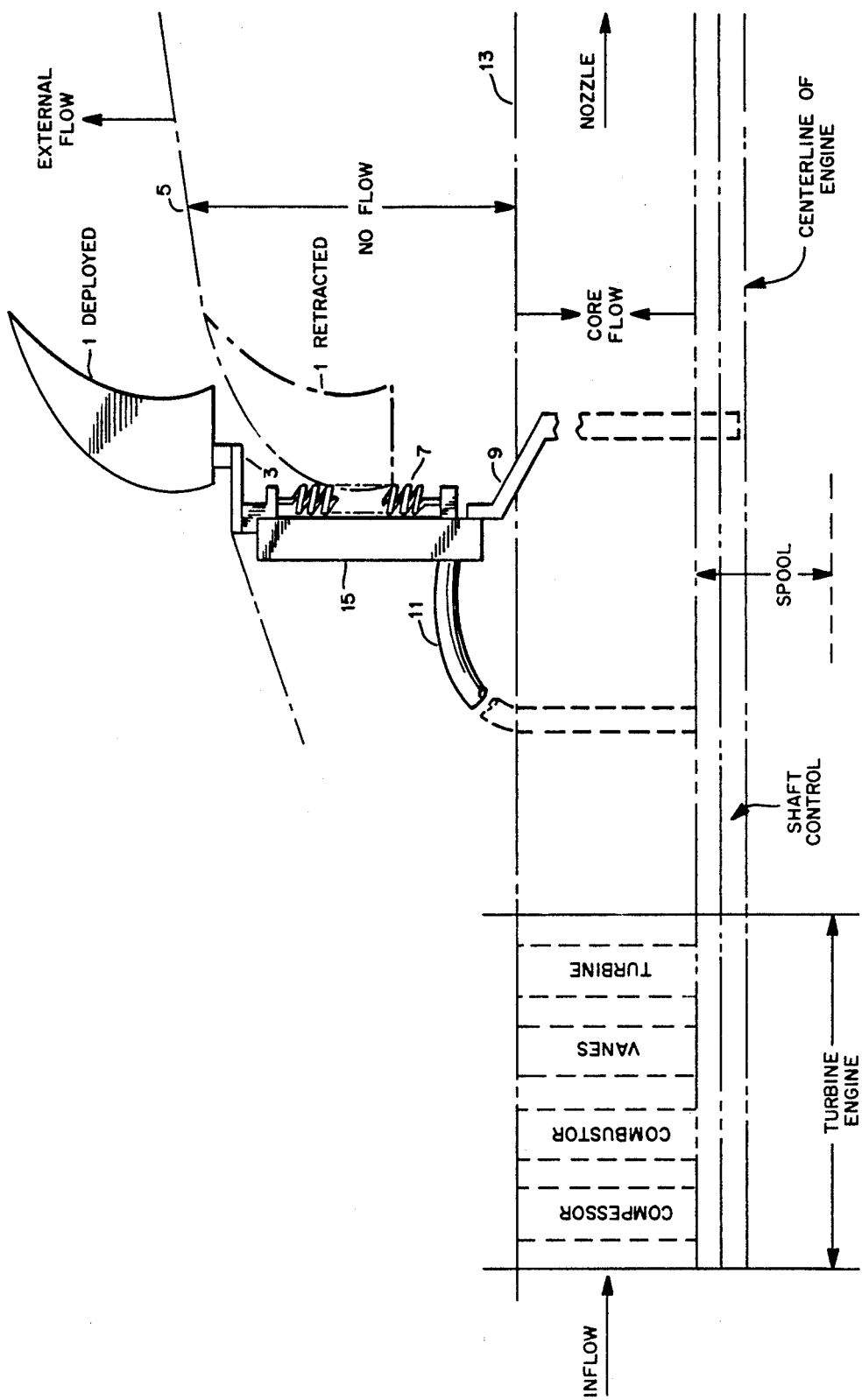
FIG. 1 is a representation of the mechanical arrangement of the present invention.

Referring now to FIG. 1, the mechanical arrangement of a variable cycle engine passive mechanism is shown in a deployed state. Shown is a single propeller blade 1 in the deployed position. As in any turboprop or turbofan engine, any practical number of propeller blades may be provided, and any known propeller design may be used, including advanced turboprop propeller designs using swept-blade planforms that operate with higher efficiency than conventional turbofans in the high-subsonic speed regime such as unducted fan propellers which feature contra-rotating propellers. Propeller blade 1 is rigidly mounted to arm 3 which provides an offset from housing 15. The offset provided by arm 3 enables propeller blade 1 to extend and retract during varied flight and ground conditions. Arm 3 is slideably attached to housing 15 in a manner to allow propeller blade 1 and arm 3 to extend and retract along the length of housing 15. A preferred arrangement would be a dovetail on arm 3 and a dovetail slot in housing 15, although other sliding means can be employed. Linkage between the turbine engine and housing 15 is provided by member 11, which is pivotably attached to the base of housing 15 at one end, e.g. as a dovetail semi-collar, and to the rotating spool of the engine at the other end.

During engine rotation, centrifugal force tends to cause propeller blade 1 to extend towards the deployed state as arm 3 slides along the length of housing 15. The centrifugal force is opposed by non-linear spring 7, which is mounted between the base of housing 15 and arm 3. At low power settings (i.e. low turbine rotational speeds) propeller blade 1 is kept in the stowed position by spring 7, as the centrifugal force is low and is completely overcome by spring 7. In this condition, all airflow takes place within the engine core boundary 13 and there is no external flow outside engine cowling 5. At all times, there is a no flow area between engine core boundary 13 and engine cowling 5.

As engine speed is increased, centrifugal force causes propeller blade 1 to begin to extend. Spring 7 is able to overcome some, but not all of the centrifugal force, and the tip of propeller blade 1 begins to extend beyond engine cowling 5. In this condition, there is a partial external flow along with a significant core flow. As the engine speed is further increased up to maximum rpm, propeller blade 1 continues to extend outward until it reaches the end of housing 15, at which point it is restrained from further extension by a stop. In this condition, there is a maximum of external flow, and the core flow through the engine surrenders most of its useful energy to the turbine.

From the foregoing, the distinct advantages of the present invention can now be seen. Installed on a turbine powered aircraft, the present invention provides a means to extract the maximum efficiency from the turbine engine at all flight envelopes. During takeoff, when the turbine is rotating at maximum speed, the propeller blades will be fully deployed and the engine will provide maximum thrust as it is essentially operating as a turboprop engine. During intermediate power settings the engine will operate more like a turbofan engine.

And at lower power settings such as supersonic cruise, the engine will operate like a turbojet. By proper selection of nonlinear spring 7, the variable cycles will be accomplished automatically without any need for the pilot to select settings, other than the pitch of the propeller blade and the pitch of the stator vane.

As in prior art turbine powered aircraft, the pitch of propeller blade 1 is controlled by pitch linkage 9 which is connected to a standard shaft control located within the engine. This type of pitch control is well known in the art and therefore requires no further discussion.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A mechanism for varying the cycle of a turbine power plant comprising:
   a housing connected to said turbine engine such that said housing rotates at the same speed as the spool of said engine;
   a plurality of propeller blades slideably attached to said housing such that at maximum rotational speed of said turbine engine said blades are extended beyond the cowling of said engine thus providing external airflow;
   means for causing said propeller blades to stow within the confines of said cowling of said engine at minimum rotational speed of said engine thus providing no external airflow;
   means for varying the pitch of said propeller blades.

2. The device of claim 1 wherein said means for causing said propeller blades to stow within the confines of said cowling of said engine at minimum rotational speed of said engine is a nonlinear spring connected between said propeller blades and said housing.

* * * * *